United States Patent [19]
Schwartz

[11] 3,990,720
[45] Nov. 9, 1976

[54] UPPER COUPLER PLATE ASSEMBLY

[75] Inventor: Robert B. Schwartz, Harper Woods, Mich.

[73] Assignee: Fruehauf Corporation, Detroit, Mich.

[22] Filed: Nov. 24, 1975

[21] Appl. No.: 634,357

[52] U.S. Cl. .............................. 280/433; 280/106 T; 296/28 M
[51] Int. Cl.² ......................................... B62D 53/06
[58] Field of Search ............ 280/433, 423 R, 415 R, 280/106 T; 296/28 M

[56] References Cited
UNITED STATES PATENTS

| | | | |
|---|---|---|---|
| 2,841,415 | 7/1958 | Black | 280/433 X |
| 2,915,320 | 12/1959 | Jewell et al. | 280/433 X |
| 3,252,715 | 5/1966 | Chieger | 280/433 |
| 3,254,904 | 6/1966 | Jewell | 280/433 |
| 3,402,943 | 9/1968 | Martin | 280/423 R |
| 3,796,457 | 3/1974 | Hinchliff | 296/28 M |

Primary Examiner—Philip Goodman
Assistant Examiner—John A. Pekar
Attorney, Agent, or Firm—Harness, Dickey & Pierce

[57] ABSTRACT

The disclosure relates to the configuration and method of fabrication of the forward underbody of a semitrailer. A lower plate of the underbody has two inverted channels welded thereto. A kingpin extends downwardly through an aperture in the lower plate and is welded in position between the two inverted channels. The kingpin and the channels are braced by laterally spaced gussets which are welded in position thereto. A top plate with angular edge flanges fills the space between the inverted channels, the edge engaging sloping corners of the channels and forming a right angle therwith. Continuous welds secure the top plate to the channels which are below the top surface thereof. The assembly thus provided is extremely strong, light in weight, and capable of assembly with conventional welding equipment and without need of repositioning the several elements during the assembly and welding process. Critical welds are spaced from the high stress areas of the secured elements.

6 Claims, 6 Drawing Figures

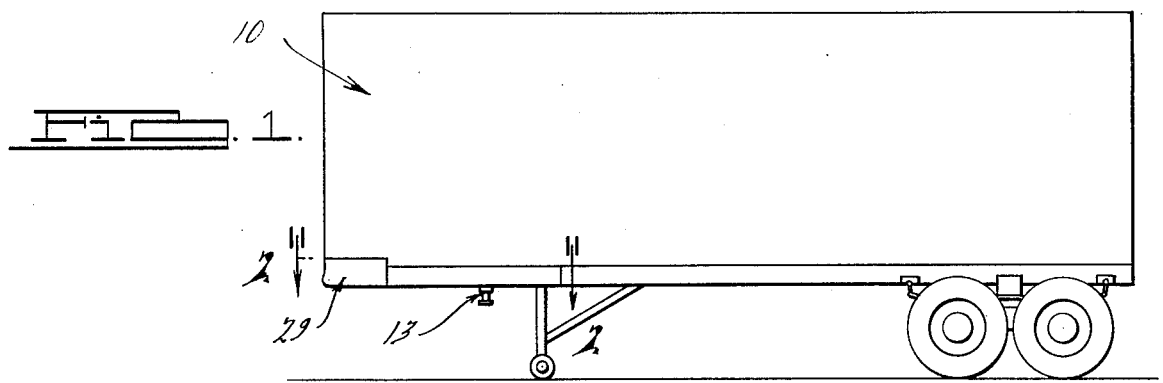
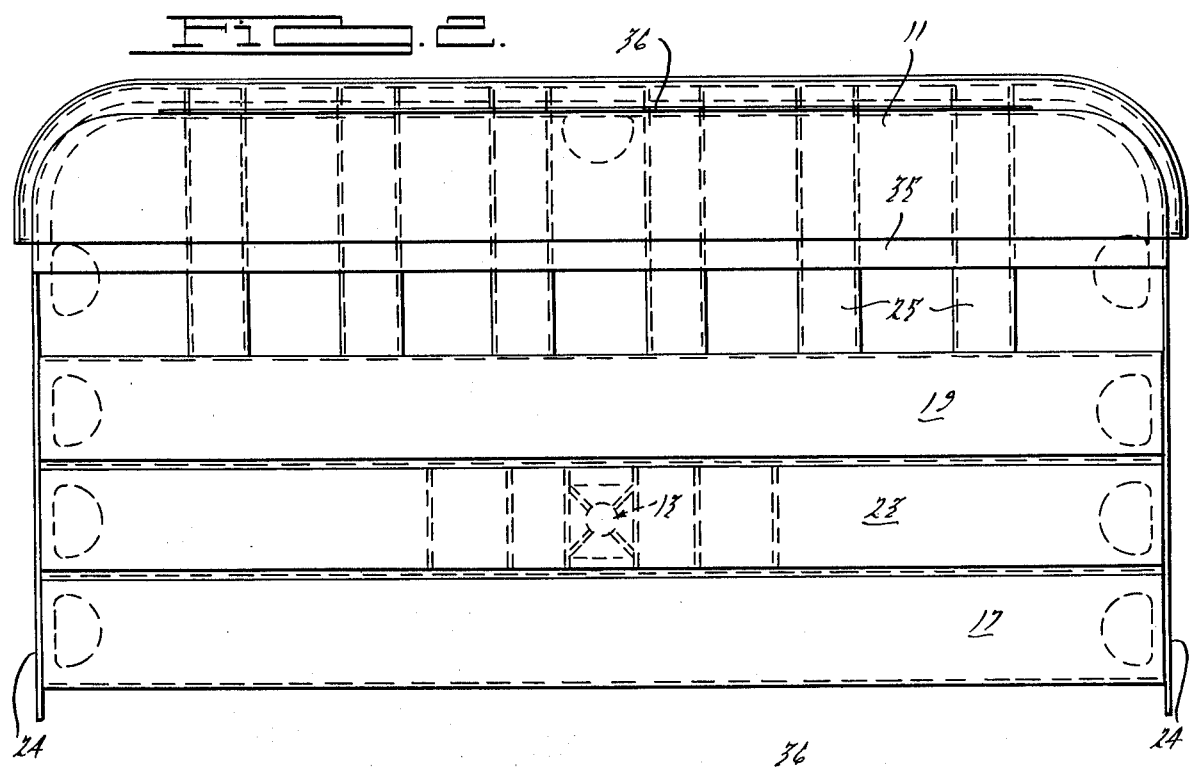
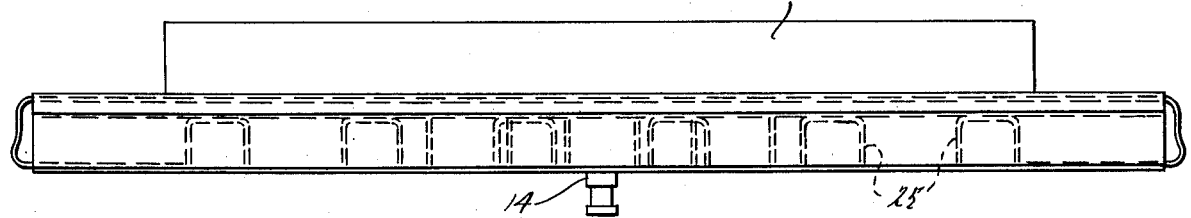
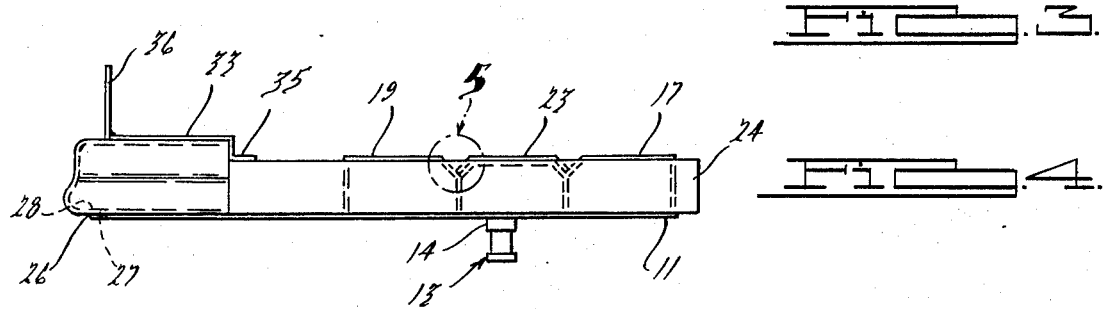

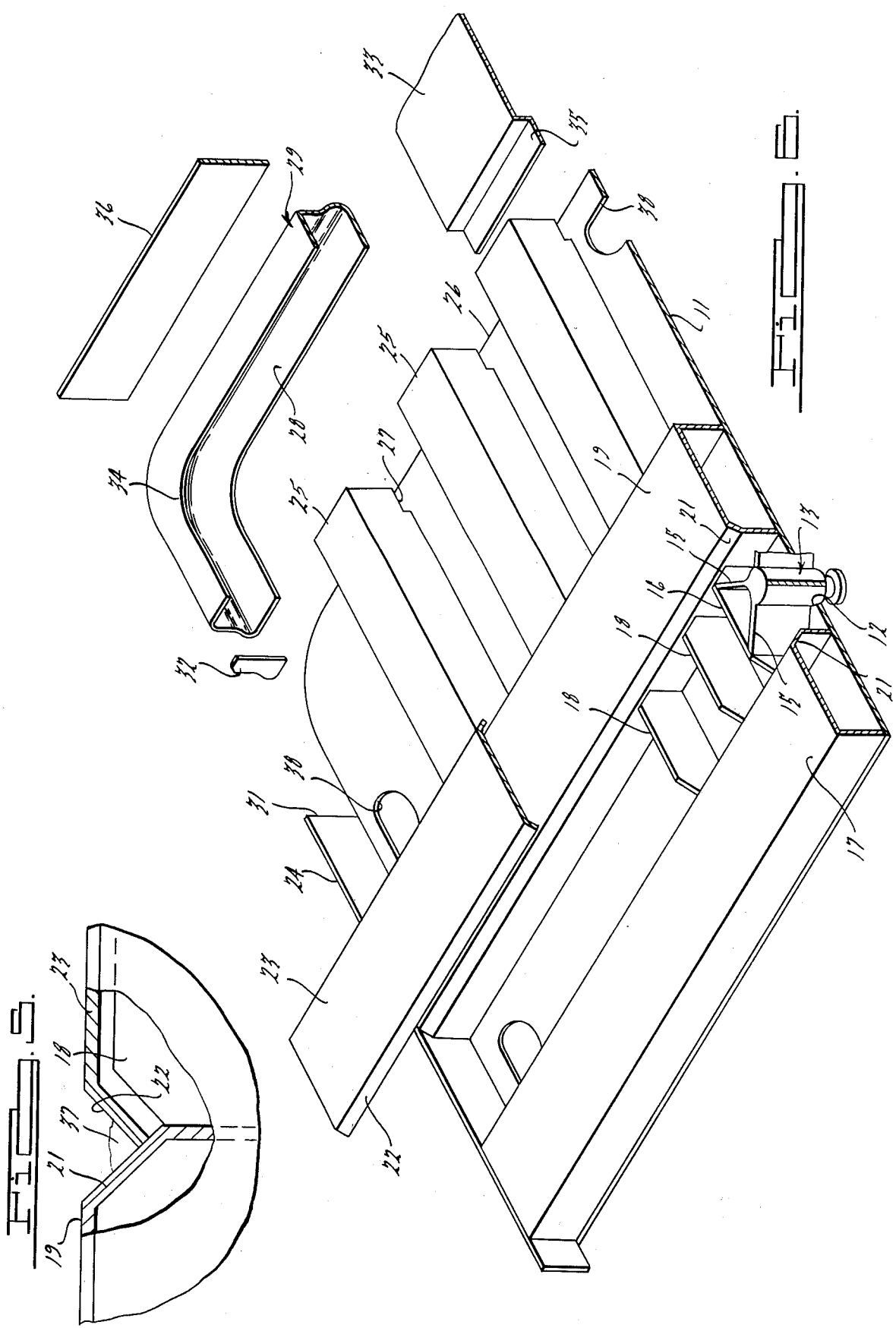

UPPER COUPLER PLATE ASSEMBLY

BACKGROUND OF THE INVENTION

Reference may be had to applicant's assignee's U.S. Pat. No. 3,252,715 to show the state of the art of an upper coupler plate which embodies a kingpin assembly.

BRIEF DESCRIPTION OF THE DRAWING

FIG. 1 is a side elevation of a semitrailer having an upper coupler plate assembly at the front end embodying features of the present invention;

FIG. 2 is a plan view of the front plate assembly taken substantially along the section line 2—2 of FIG. 1;

FIG. 3 is an end view of the structure illustrated in FIG. 2, as viewed from the end opposite to that having the bumper thereon;

FIG. 4 is a side view of the structure illustrated in FIG. 2, as viewed from the lefthand side thereof;

FIG. 5 is an enlarged broken view of the structure illustrated in FIG. 4, as viewed within the circle 5 thereof, and FIG. 6 is an enlarged exploded view of one-half of the structure illustrated in FIG. 2.

DESCRIPTION OF THE PREFERRED EMBODIMENTS

The invention herein illustrated and described pertains to the underframing for a semitrailer body 10 at the forward end thereof. The assembly comprises a bottom plate 11 having an aperture 12 therein through which a kingpin 13 extends. A bottom end 14 of the kingpin 13 extends below the bottom plate 11 in position to be engaged by the fifth wheel of a tractor.

As best seen in FIG. 6, an inverted U-shaped rear channel element 17 is first welded to the plate 11. An inverted U-shaped inner channel element 19 is next welded to the bottom plate 11. Side plates 24 are thereafter welded to the bottom plate 11 and channels 17 and 19, access to the components being provided by the open configuration at that point to maximize welding efficiency.

The kingpin 13 has four arms 15 disposed in 90° relation to each other, which are first welded to a pair of gusset plates 16, which are thereafter welded together with the additional gusset plates 18 to the plate 11 and the channels 17 and 19.

It is to be noted that the inverted channel elements 17 and 19 have angularly disposed corners 21 between the bight and leg portions thereof to provide weld surfaces for the downwardly angled edge portions 22 of a cover plate 23.

It is further noted that during the course of assembling and welding the bottom plate 11, the channels 17 and 19, the gusset plates 16 and 18, the kingpin 13, the side plates 24, and the cover plate 23, no requirement is imposed and, its attendant added manufacturing costs, to reposition any of these elements, such as by tilting or inverting. As the assembly and welding progresses, full access for the most practical welding position to achieve good quality weld joints is provided.

Forwardly of the channel element 19, six (6) inverted, U-shaped channel elements 25 are now welded at right angles thereto and extend to a forward edge 26 of the plate 11. The forward edges of the channel elements 25 have notches 27 cut therein for the reception of the bottom flange 28 of a bumper 29. The bumper 29 is a U-shaped cross section, the legs thereof extending rearwardly. The bumper 29 terminates at a forward edge 31 of the side plates 24. A plate 32, the shape of the bumper cross section, is welded to the bumper ends and the end of the plates 24. An apron 33 is welded to a top flange 34 of the bumper 29 and has a downwardly offset flange 35 resting on and welded to the tops of the channel elements 25 and the top of the side plates 24. A bulkhead plate 36 is welded to the forward edge of the apron 33 and to the top flange 34 of the bumper, as illustrated in FIG. 4.

As illustrated in FIG. 5, the plate 23 is welded to the channel element 19 by a weld 37 which is spaced below the top surface of the plate 23. The upper coupler assembly, as it is intended to be employed, behaves under load principally as a lateral beam member. The upper coupler assembly bends laterally with the bottom plate acting as the lower flange of the bending member with compressive stresses in the lateral direction. The top surfaces of channels 17 and 19, as well as top plate 23, act as the tensile flange of the beam. The maximum stress in the beam member occurs at the extreme fibers of these flange members. Portions of the beam closer to its neutral axis are proportionately less severely stressed. With the weld connections between the inverted channels 17 and 19 and the top cover plate 23 spaced from the extreme fiber and closer to the neutral axis, the stresses at the weld connections are significantly reduced from the stresses encountered at the extreme fibers of the beam. Since the weld is less highly stressed than would be the conventional case where the weld is located at the zone of maximum stress, the assembly will endure longer life under the cyclic and dynamic nature of the loading. Moreover, the edges 22 of the top plate 23 engage the corners 21 of the channel elements 17 and 19 in right angular relation to thereby provide the optimum orientation of the elements for welding.

What is claimed is:

1. An upper coupler plate assembly comprising a bottom plate having a kingpin aperture, a pair of U-shaped inverted laterally extending channels spaced forwardly and rearwardly from said kingpin aperture and welded to said bottom plate, a kingpin extending through said aperture, a pair of longitudinally extending gussets on opposite sides of said kingpin welded thereto and to said channels and bottom plate, and a cover plate covering said kingpin and extending between said channels and welded to the adjacent corners of the inverted U-shaped channels below the upper extremity of the cover plate and channels.

2. A coupler plate assembly, as recited in claim 1, wherein angularly disposed edge portions are provided on the corners of said laterally extending channels adjacent to said kingpin, said cover plate having angularly disposed edge portions thereby to space said welds below the upper extremities of said cover plate and channels.

3. A coupler plate, in accordance with claim 1, wherein a plurality of inverted U-shaped channel elements extend longitudinally forwardly of said forward lateral channel and are welded to said bottom plate.

4. A coupler, in accordance with claim 3, wherein a U-shaped front bumper is welded to said longitudinal channels and to said bottom plate to close the open forward ends of said longitudinal channels.

5. A method of fabricating an upper coupler plate assembly comprising the steps of providing a bottom plate with kingpin aperture, welding a pair of U-shaped inverted laterally extending channels to said bottom plate forwardly and rearwardly of said kingpin aperture, welding a pair of side plates to the ends of said channels and to said bottom plate so as to close said channels, welding a kingpin to said bottom plate with a portion thereof extending through said aperture, and welding a cover plate over said kingpin and to said channels at the adjacent corners of the U-shaped channels below the top surface thereof.

6. A method of fabricating an upper coupler plate assembly, as recited in claim 5, including the steps of providing angularly disposed edge portions on the corners of said inverted laterally extending channels adjacent to said kingpin, providing said cover plate with angularly disposed edge portions, and said step of welding said cover plate to said channels includes welding the edge portions of said cover plate to the angularly disposed edge portions of said channels whereby said welds are spaced below the upper extremities of said cover plate and channels.

* * * * *